(12) United States Patent
Oexman et al.

(10) Patent No.: US 6,585,328 B1
(45) Date of Patent: Jul. 1, 2003

(54) CUSTOMIZED MATTRESS EVALUATION SYSTEM

(75) Inventors: Robert D. Oexman, Carthage, MO (US); David B. Scott, Carthage, MO (US)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 09/544,958

(22) Filed: Apr. 7, 2000

Related U.S. Application Data (60) Provisional application No. 60/128,104, filed on Apr. 7, 1999.

(51) Int. Cl.[7] .............................................. G06F 19/00
(52) U.S. Cl. ............................ 300/117; 700/108; 5/706
(58) Field of Search ............................... 700/1, 9, 108, 700/117, 206; 732/172, 818; 5/713, 706, 926, 722

(56) References Cited

U.S. PATENT DOCUMENTS

| | | | |
|---|---|---|---|
| 2,378,039 A | 6/1945 | Schenker | 73/172 |
| 2,976,725 A | 3/1961 | Byer | 73/172 |
| 3,100,992 A | 8/1963 | Davis | 100/273 |
| 3,195,347 A | 7/1965 | Janapol | 73/806 |
| 3,334,517 A | 8/1967 | Janapol | 73/161 |
| 3,413,849 A | 12/1968 | Janapol | 73/819 |
| 3,678,520 A | 7/1972 | Evans | 73/161 |
| 3,834,228 A | 9/1974 | Wachholz | 5/939 |
| 4,140,008 A | 2/1979 | Golembeck et al. | 73/818 |
| 4,662,012 A | 5/1987 | Torbert | 5/713 |
| 4,669,302 A | 6/1987 | Wagner et al. | 7/713 |
| 4,803,744 A | 2/1989 | Peck et al. | 5/713 |
| 4,982,466 A | 1/1991 | Higgins et al. | 73/172 |
| 4,986,738 A | 1/1991 | Kawasaki et al. | 5/713 |
| 4,989,283 A | 2/1991 | Krouskop | 5/713 |
| 5,010,772 A | 4/1991 | Bourland et al. | 73/862 |
| 5,062,169 A | 11/1991 | Kennedy et al. | 5/713 |
| 5,129,115 A | 7/1992 | Higgins et al. | 73/865 |
| 5,148,706 A | 9/1992 | Masuda et al. | 6/595 |
| 5,253,656 A | 10/1993 | Rincos et al. | 5/710 |
| 5,586,348 A | 12/1996 | Toivio et al. | 73/865 |
| 5,641,917 A | 6/1997 | Hurite et al. | 5/727 |
| 5,745,940 A * | 5/1998 | Roberts et al. | 5/727 |
| 5,794,288 A | 8/1998 | Soltani et al. | 5/713 |
| 5,815,865 A * | 10/1998 | Washburn et al. | 5/706 |
| 5,848,450 A | 12/1998 | Oexman et al. | 73/172 |
| 5,963,997 A | 10/1999 | Hagopian | 73/867 |
| 5,970,789 A * | 10/1999 | Meyer et al. | 73/172 |
| 5,993,400 A | 11/1999 | Rincoe et al. | 600/596 |
| 6,034,526 A | 3/2000 | Montant et al. | |

* cited by examiner

Primary Examiner—Leo Picard
Assistant Examiner—Kidest Bahta
(74) Attorney, Agent, or Firm—Wood, Herron & Evans, L.L.P.

(57) ABSTRACT

A customized mattress evaluation system allows for uniquely designed mattresses based upon a particular customer's physical attributes. The system allows a retail mattress store to collect data from a sensor pad positioned on top of a support surface to generate a pressure profile for that person. The pressure profile and other information are used to generate specific mattress design parameters or co-efficients which are then utilized in designing a specific mattress uniquely customized for that person. Body type coefficients characteristic of an individual customer are correlated with coefficients developed for test persons for which various bedding products have been optimized. The optimization includes the rating of various bedding products for various body types by minimizing support pressures across the mattress and optimizing lumbar support for desired spinal curvature.

15 Claims, 4 Drawing Sheets

Microfiche Appendix Included
(1 Microfiche, 60 Pages)

CUSTOMIZED MATTRESS EVALUATION SYSTEM

This application claims priority to U.S. provisional patent application Ser. No. 60/128,104, filed Apr. 7, 1999, hereby expressly incorporated by reference herein.

FIELD OF THE INVENTION

This invention relates to the designing or selecting of mattresses and mattress and box spring foundation unit assemblies that are most suitable for persons of various body types, and particularly to the providing of customized mattresses or mattress and box spring assemblies for individual persons.

This application contains a microfiche appendix with a total of 1 sheet of microfiche with a total of 60 frames.

BACKGROUND OF THE INVENTION

Many different mattresses and foundation units are currently available on the market. Each of these may provide acceptable comfort and support for some persons who use them, but all will be less suitable for at least some users. The differences among individual persons with respect to their body frames, physiques and weights and their individual physical characteristics and desires are large. These differences account for differences in the suitability of particular mattresses or mattress and box spring combinations among members of the public. Presently, there exist systems for determining how pressure may be distributed between the upper supporting surface of a mattress and a person reclining on the mattress. But systems that take into account the support provided by a mattress in maintaining alignment of the spine and other body parts for a particular person or particular type of person are not available.

A need exists for a bedding product providing system that gives users support as well as comfort, particularly a system for correlating the support capabilities of a mattress or mattress system with the support requirements of individual users. There is a particular need for systems for evaluating, designing or selecting particular mattresses or mattress systems for individuals of specific body characteristics and for designing, selecting or customizing such mattresses or mattress systems to meet the support and comfort requirements of such individuals.

SUMMARY OF THE INVENTION

An objective of the present invention is to provide specific individuals or persons of specific body types with mattresses or mattress and foundation sets that are particularly suited for optimal comfort and support.

A particular objective of the invention is to provide a system and method which determines both pressure distribution and body support requirements for providing mattress systems to individuals based on the particular body characteristics of the individual.

Further objectives of the present invention are to provide a system and method capable of optimizing pressure characteristics of a person on a mattress and capable of taking into account the support characteristics that the mattress provides for the person.

The present invention attains the above described objectives, overcomes the drawbacks of known systems of the prior art and fills the needs set forth above.

According to the principles of the present invention, data is acquired of the body characteristics of an individual customer. The data preferably includes body dimensions of the person such as, for example, height, torso length, hip width, waist width and shoulder width, as well as the overall weight of the person.

Preferably, the data is collected by providing a pressure sensor array on the surface of a standardized support such as an airbed mattress and collecting pressure data over the two-dimensional array. The overall air mattress pressure is also recorded. In the preferred embodiment, the data is processed by a computer which derives the body characteristics of the individual.

Further, according to the invention, data is provided that relates each of a plurality of bedding products, that is, mattresses and mattress and box spring combinations, having different design properties with body characteristic profiles of persons for whom the bedding product provides correct support. Preferably, this data is collected by causing each of a plurality of representative people to recline on each of the plurality of bedding products, evaluating and quantizing the support provided for that person, and measuring, using a pressure sensor array, the pressure distribution of the person when properly supported. Data which rates the support provided for such person by the bedding product as well as data which rates the pressure distribution are tabulated for each combination of bedding product and each body profile.

In one embodiment of the invention, body profiles of each of the representative people used to test the bedding products are classified by having each such person recline on a test device that includes a test pad on the air mattress. The test pad and air mattress system is standardized so that the data is taken under conditions that are the same for each of the prospective customers of a bedding product. Air pressure sensors are connected to the air mattress to provide data of the total air pressure in the mattress, or on various zones of the mattress, when a person is lying on the test device. The test pad includes an orthogonal array of pressure transducers, for example 30×30 array of pressure sensors, that measure local pressures exerted between the pad and the body of the person lying on the device.

With the preferred embodiment, a large number of body types are tabulated. A large number of bedding products are also evaluated. These bedding, products include unique combinations of box spring, inner spring, and various layers of padding or fill, including, for example, bottom fill and top fill. With combinations made up, for example, of four box springs, seven inner springs, four types of bottom fill and two types of top fill, a total of 168 mattress and box spring combinations are possible. Each combination is evaluated with respect to each of several different body types. The product evaluations may be carried out with each of a representative plurality of physically different test persons lying on each product and data being taken to quantitatively rate each such product with respect to support and pressure distribution it provides to each such test person. Each test person is also tested on the standardized pad and airbed system and the body type of each such test person is automatically classified by the computer. A table evaluating each bedding product for each body type can be generated.

In the preferred embodiment of the invention, rather than providing data for each of a plurality of body types and for each of a plurality of bedding products, 168 bedding products in the example above, certain body characteristics can be correlated to coefficients for each of the various bedding components. For example, one coefficient can be derived from each body type as primarily affecting selection of the box spring, with another coefficient for inner spring, another for bottom fill and another for top fill. It is found that overall weight most affects the box spring selection, while weight distribution most affects inner spring selection. Various body dimensions affect selection of fills or padding.

According to alternative embodiments of the invention, instead of the customer reclining on a pressure array pad on an air mattress, no pressure pad array is used, but the person is asked to provide certain body characteristic information. In one such alternative embodiment, the person is asked to recline on a standardized airbed and an overall pressure reading is taken. The person answers a limited number of questions. The answers to the questions and the overall pressure reading are correlated by a computer with the mattress that most closely provides the optimal support and minimal pressure to a person most closely matching the body profile. This embodiment is suitable for providing a customer with the most suitable one of a small number of bedding products, for example four or five products, based on a minimum of questions, such as sex, age, height and whether a person experiences any particular pain. In another such alternative embodiment, no measurements are taken, but only questions are asked of the customer, and the questions are more extensive. Additional questions such as the weight of the person and various clothing sizes of the person are filled out on a questionnaire. This embodiment also is mainly suitable for selecting the best bedding product from among a relatively small number of possible products, for example, four.

The present invention allows a customer to enter a retail mattress store or the like, and purchase a mattress which is customized specifically for that person. The individual will be asked to lie down on an evaluation mattress and/or complete a questionnaire. In the preferred embodiment, where a pressure array pad is used in combination with an air mattress, the pad is positioned atop the standardized evaluation air mattress. The pad includes a plurality of pressure sensors that measure the pressure between the person lying on the mattress and the mattress. The computer scans the pressure data output by the sensors of the pad array and, by scanning the sensors in particular orders and interpreting the sensor outputs, the coordinates of the extremities of the person lying on the mattress are located and body dimensions and other parameters are determined. The pad gathers information from a person lying on the pad, such as the person's height, the person's weight, the distribution of the person's weight or the support pressure value distribution over the various sensors of the array, the area over which the person's weight is distributed, the width of the person's shoulders, the width of the person's waist area and the width of the person's hips, and the weight born by certain areas of the pad such as that supporting the lumbar area. In particular, data correlated to the lumbar curve of the person's back when in a lying position is derived.

From the measured and derived information, the system's computer preferably generates a plurality of coefficients that are most useful for determining one or more mattress system components that provide the best comfort and support for the customer. A decision as to which mattress system design provides the best comfort and support for a person of a particular body type can be made by any of the various theories supported by professionals. The present invention assumes that the appropriate mattress system for a given body type is that which provides the lowest maximum pressure between the person and the upper support surface of the mattress while providing a spinal curvature that is regarded as proper by knowledgeable professionals.

In the illustrated embodiment of the invention, four coefficients are derived. These include a coefficient that relates to the box spring, one that relates to the innerspring, and two that relate to mattress fill materials, including one that relates to a bottom fill material which includes padding adjacent the innerspring unit, and one that relates to a top fill material which includes additional the quilted ticking and additional padding that provides the outer covering of the mattress. In determining the coefficients, the computer of the system computes the spinal support required for the individual and certain body weights and dimensions from the pressure pad data. The computer calculates and displays a body contact profile, a spinal support profile, body distribution profile and other comfort and support factors. A graph showing respiratory effort will be generated from the mattress on which the pad is placed. The coefficients that are generated from the evaluation system correlate to components available for manufacture of a mattress or foundation unit that will be custom built according to each customer's unique body shape and weight or to select an available and compatible mattress and foundation unit from stock.

In the preferred embodiment, body type coefficients are produced and correlated with a table of product design parameters to arrive at the optimum bedding product for the user according to the user's particular body type. The correlation table is preferably generated by a method of determining the support characteristics of each test mattress in a mattress retailer's catalog or inventory relative to the weight and size profiles of a plurality of individual test persons. The method may, for example, include the steps of (a) measuring the weight distribution profiles of numerous different height, weight and shaped test persons; (b) measuring and determining the optional deflection profile of those same persons for optimal support; (c) inputting the information of steps (a) and (b) into a computerized control; (d) locating a selected mattress in a test apparatus; (e) applying a weight profile load of selected test profile persons to pistons connected to independently movable pressure plates of the test apparatus, which pressure plates are positioned and sized on the mattress so as to mimic the shape of the selected persons: (f) measuring the deflection of each pressure plate into the test mattress; and (g) comparing the measured deflection characteristics of the test mattress to the optional support deflections for the test profile persons. Alternatively, the table may be generated by a method of determining the support characteristics of each test mattress relative to human weight and size test person profiles by (a) measuring the weight distribution profile of numerous different height, weight and shaped test persons; (b) measuring and determining the optional deflection profile of those same persons for optimal support; (c) inputting the information of (a) and (b) into a computerized control; (d) locating a selected mattress in a test apparatus; (e) applying optimum deflection characteristics profile of a selected test profile person to that mattress by applying pressure to pistons connected to independently movable pressure plates of test apparatus, which pressure plates are positioned and sized so as to mimic the shape of the selected test profile person; and (e measuring the pressure on the pistons to obtain this optimum deflection.

BRIEF DESCRIPTION OF THE DRAWINGS

The objectives and features of the invention will become more readily apparent from the following detailed description taken in conjunction with the accompanying drawings in which.

DETAILED DESCRIPTION OF THE INVENTION

Figure 1:
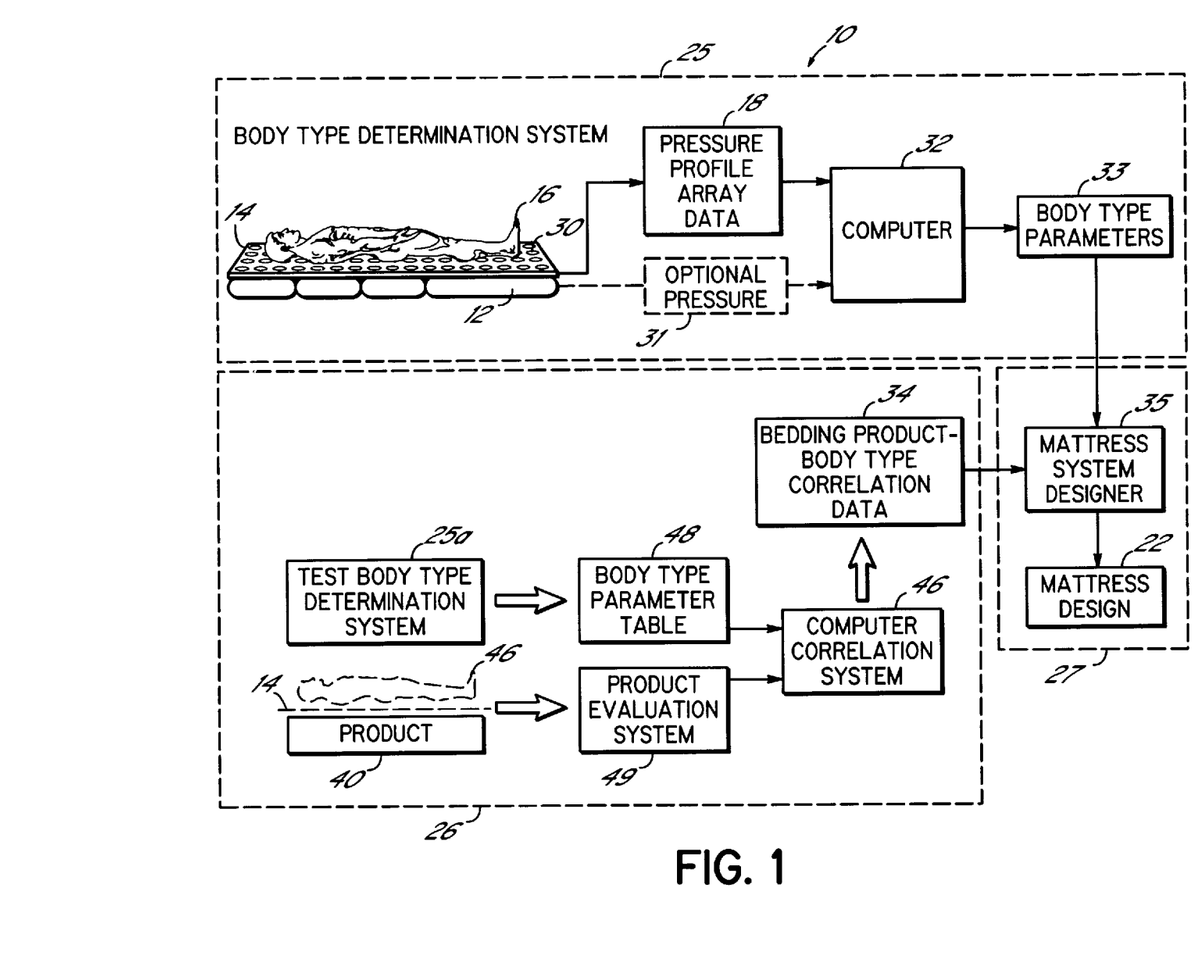
FIG. 1 is a diagrammatic representation of the system according to a presently preferred embodiment of this invention.

FIG. 1 schematically shows a customized mattress providing system 10 according to one embodiment of the present invention. The system 10 is a customized mattress evaluation, selection or designing system and includes an automated body type determination subsystem 25 by which data characteristic of a person's body shape or body type is generated. The system 10 also includes a bedding product rating data source or subsystem 26 and a mattress selection or designing subsystem 27. The mattress selection or designing subsystem 27 includes a manual or automated system by which mattress product design information from the bedding product rating data source 26 is correlated with specific body type information from the system 25 for an individual bedding customer to arrive at a design for a mattress produce that has been custom designed or selected for that customer.

The body type determination subsystem 25 includes a support surface 12 which may be typically located in a retail mattress store. The support surface 12 is preferably an air bed or some other structure that can be assured of producing standardized support characteristics that are consistent over time. Such an air bed may typically have a plurality of sealed zones, typically four in number, with a specified and constant amount of pressure in each. Pressure of the air bed zones is typically at or near twelve inches of water pressure in an unloaded state. The subsystem 25 further includes a pressure sensor array pad 14, which is positioned on the top of the support surface 12. The pad 14 includes an array of pressure sensors 30, of for example 900 or 1,024 in number. Preferably the array is rectangular with the sensors 30 arranged in a plurality of orthogonal columns and rows. The sensors 30 are calibrated to each produce a zero output when no person is reclining on the pad, but to each produce an output signal proportional to the pressure exerted on an area of the pad at which the sensor is located In use, a person 16, for example an individual bedding customer, lies on the pad 14 while it is positioned on top of the support surface 12. Pressure on each of the individual pressure sensors 30 of the pad 14 is measured by the sensors 30 and a pressure signal containing pressure profile array data 18 is generated. Optionally, pressure sensors (not shown) in the zones of the airbed support 12 may also generate signals of support pressure data 31 of each of the airbed zones. The signals 18 and 31 are relayed to a computer 32 or other processor which records digital information of the pressure profile 18, and pressure data 31 if used, of the person 16 lying on the support surface 12.

Figure 2:
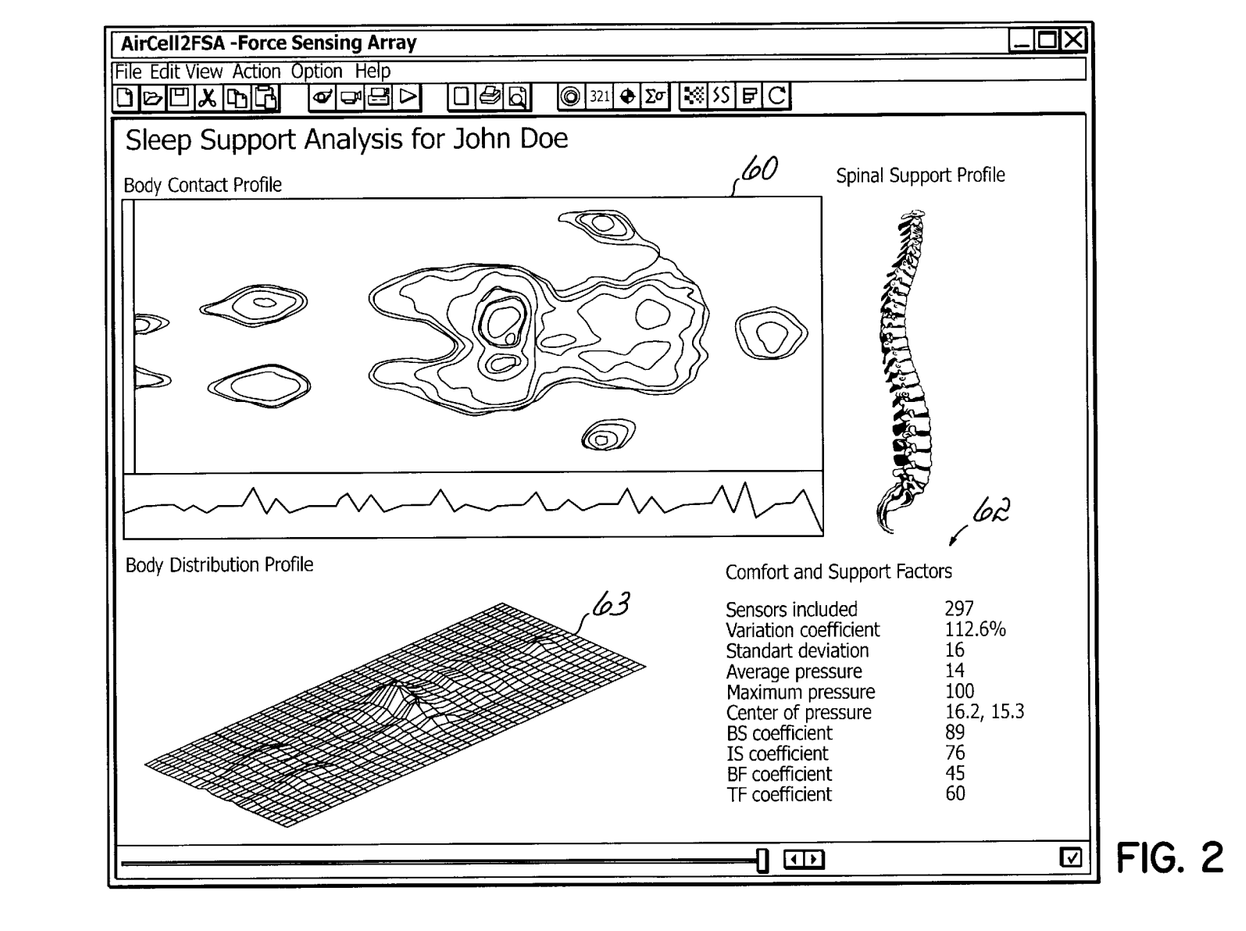
FIG. 2 is a representative display of pressure profile information generated and utilized in this invention.

The computer 32 derives information from the digital information records by processing the data. The information which can be derived form the pressure data includes, for example, that of the person's height, weight, distribution of weight, width of shoulders, width of waist area, width of hips and the lumbar curve of the person's back when in the lying position. The pad 14, along with the sensors 30 and the software or algorithm for generating the pressure profile is commercially available from Vista Medical of 120 Maryland Street, Winnipeg Manitoba, Canada. The Vista Medical Force Sensing Array: Pressure Mapping System is described by its manufacturer as a clinical tool used to assess pressure distribution and positioning. The information from the force sensing array pad or mat is displayed on a computer screen as easy to understand color graphics and data, a sample 60 of which is shown as FIG. 2, with different colors codes 61 used to illustrate different pressure readings. Numerous display options of the system may include a table 62 of numerical pressure values and statistical data, and three-dimensional wire-grid representation 63 of the pressure distributed over the array of the pad 14.

The pressure profile data generated for the individual person is then used, in a preferred embodiment, to generate specific body shape coefficients or other body type parameters 33 which define mattress design parameters. In a presently preferred embodiment, the mattress design parameters include a box spring coefficient, an innerspring coefficient, a bottom fill coefficient and an upper fill coefficient. The program in the computer 32 which generates these mattress design parameters in a presently preferred embodiment is written the Microsoft VISUAL BASIC computer language, a source code of which is set forth in Appendix A to this application.

In particular, the program in computer 32 reads in the data from the sensors 30 by scanning the outputs of each of the sensors of the rows and columns of the array of the pad 14 with a user reclining on the pad. In the program set forth in Appendix A, note that the rows are defined as being parallel to the body of the user 16 while the columns are defined as transverse to the body of the user 16. First, the output of each of the sensors 30 of the array is tested against a minimum threshold to determine the area of the pad that is supporting the weight of the user. This area is represented by the number of sensors having a reading above the threshold. Second, the pressure outputs of each of the sensors 30 are summed and from this sum the weight of the user is calculated. Third, the weight of the user is divided by the number of sensors supporting the user to arrive at an average pressure per unit area or weight distribution.

Next, the outputs of the sensors are scanned from the ends of the rows to locate the extreme head and foot positions of the user on the pad. From these head and foot positions, the height of the user is calculated. The crotch height of the user is also calculated from the head and foot positions, using statistically averages body proportions. Then, from the head and foot positions, a calculation is made of the user's shoulder height, using statistically average body proportions, and at this height the shoulder positions of the user are determined by scanning sensor outputs from opposite ends of the columns at this shoulder height, and from the shoulder positions the user's shoulder width is calculated. In addition, positions of the shoulders, such as the top of the shoulders, the center of the shoulders and the center of the hips can be determined by scanning the sensor outputs and computing intermediate positions. Such additional determinations are optional, and may be used to determine the position of the user on the pad and to make corrections in the event that the user is not reclining on the center of the pad.

Further, lumber support is determined. This determination uses the crotch height and waist center calculations to define a rectangular area of the pad that is supporting the lumbar portion of the users back. The total pressure readings of the sensors 30 over this lumbar area is calculated and this total lumbar force is divided by the average pressure calculation of the entire user support area to produce a lumbar curve coefficient. This area provides information that can be correlated with empirical data from which correlation the lumbar curve of the user can be determined.

From the above measurements and calculations, four coefficients are derived which define the body type parameters that serve as the mattress design parameters discussed above. One is a box spring coefficient which is directly proportional to the total calculated weight of the user. Another is the innerspring coefficient which is proportional to the total weight of the user divided by the average pressure on the sensors 30 in the support are of the pad 14, which is proportional to the area of support or total number of sensors measuring pressure. Additionally, a bottom fill coefficient is calculated by dividing the total weight of the user by the user's shoulder width and a top fill coefficient is set as directly proportional to the lumbar curve coefficient. All of the coefficients are multiplied by constants.

The specific mattress design parameters or above-identified coefficients are used to specially make a mattress or mattress and box spring combination optimally compatible with the individual customer. Alternatively, based upon the mattress design parameters or coefficients, a specific mattress available from stock which closely approximates or satisfies the mattress design parameters or coefficients is selected for the individual. The designing or selection of a mattress may be carried out manually or automatically by correlating the body type or shape parameter data 33 generated by the subsystem 25 from the individual customer with product vs. body type correlation data 34.

The body type correlation data 34 is preferably produced by the manufacturer of the system 10 with bedding product rating data source or subsystem 26 by evaluating various bedding products of a bedding manufacturer and producing a table that correlates various body types, defined by unique combinations of body type coefficients, with support characteristics of the different bedding products. Preferably, the correlation data is generated by generating body type parameter data 48 from a plurality of test persons using a subsystem 25a that is identical to the body type determination system 25 described above. The same test persons or a simulation thereof are then caused to subject the same supporting pressure distribution or support deflection to bedding products having different combinations of the components of box spring, inner spring, top fill and bottom fill. The suitability of each product for supporting the loads of each test person are then evaluated by a professional evaluation system 49, which can be under the guidance of medical professionals. A computer 50 may then be used to correlate the data 48 of the body types of each test person with the rating data 49 of the various bedding products. The mattress design or selection subsystem 35 matches the body type parameter data 35 from the individual customer with the bedding product vs. body type correlation data 34 to arrive at a customized mattress design 22.

Figure 3:
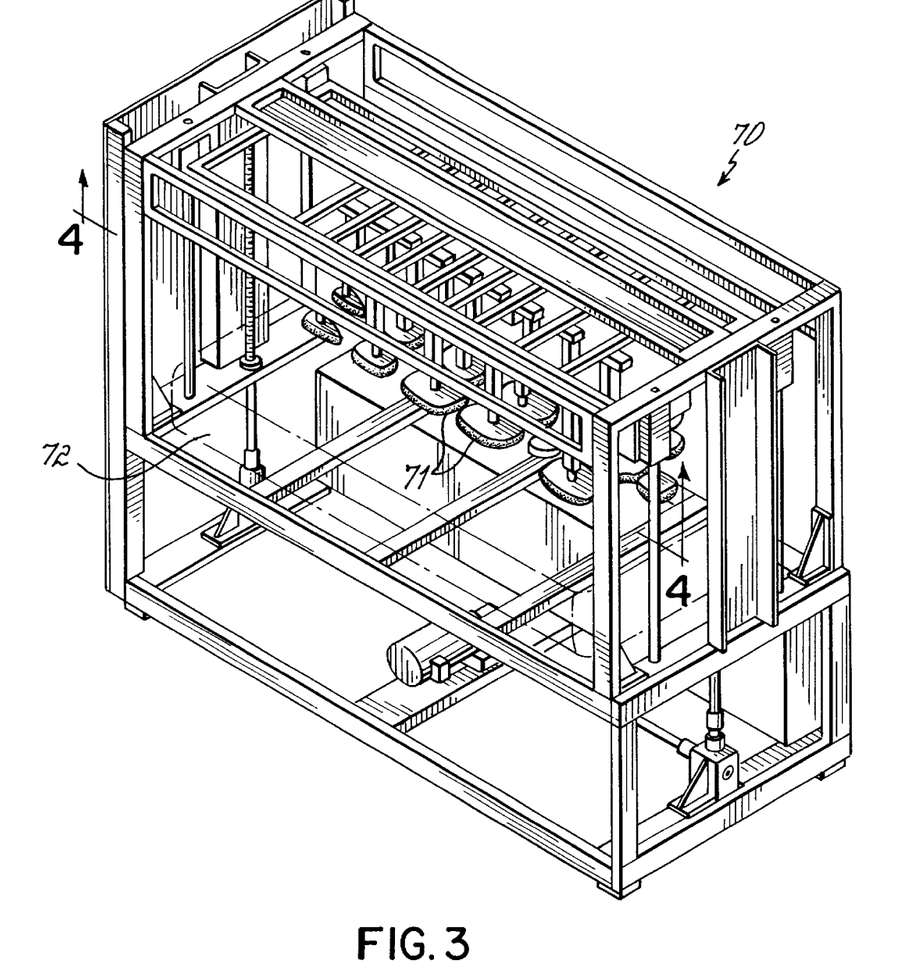
FIG. 3 is a perspective view of a mattress product rating subsystem for use with the system of FIG. 1.
Figure 4:
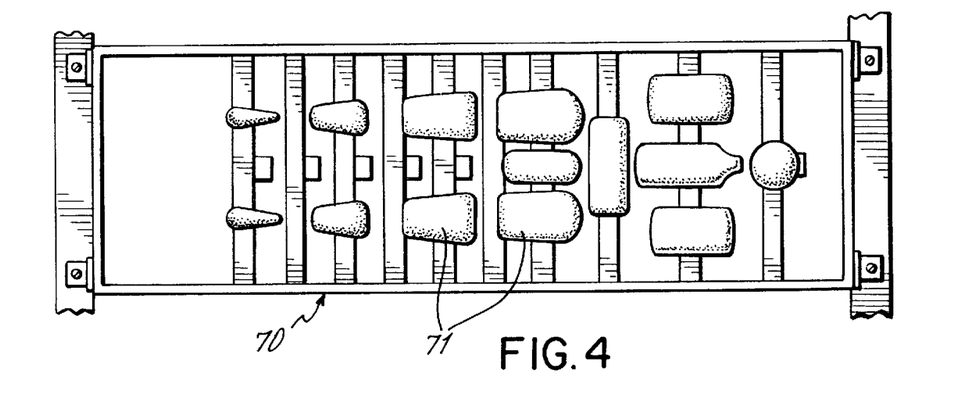
FIG. 4 is a cross-sectional view of the subsystem of FIG. 3.
Figure 5:
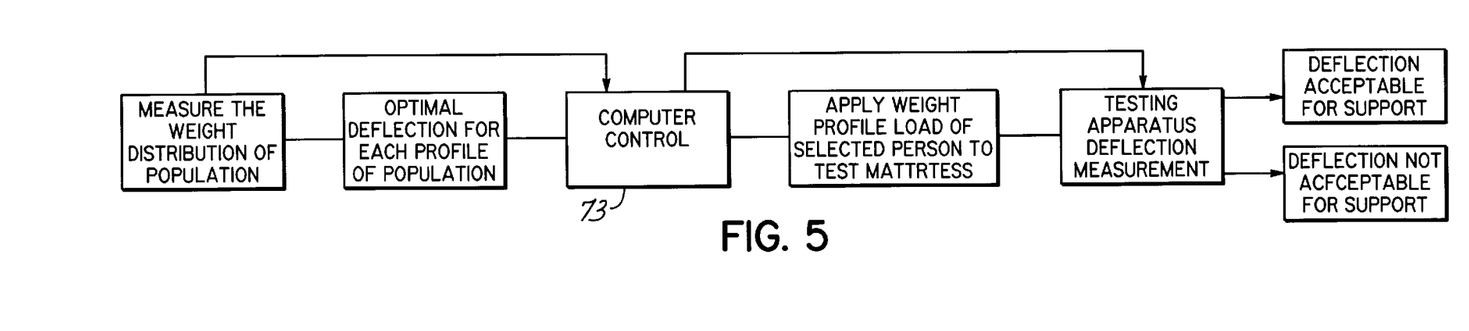
FIGS. 5 and 6 are diagrams of the operation logic of the mattress product rating subsystem of FIGS. 3 and 4.
Figure 6:
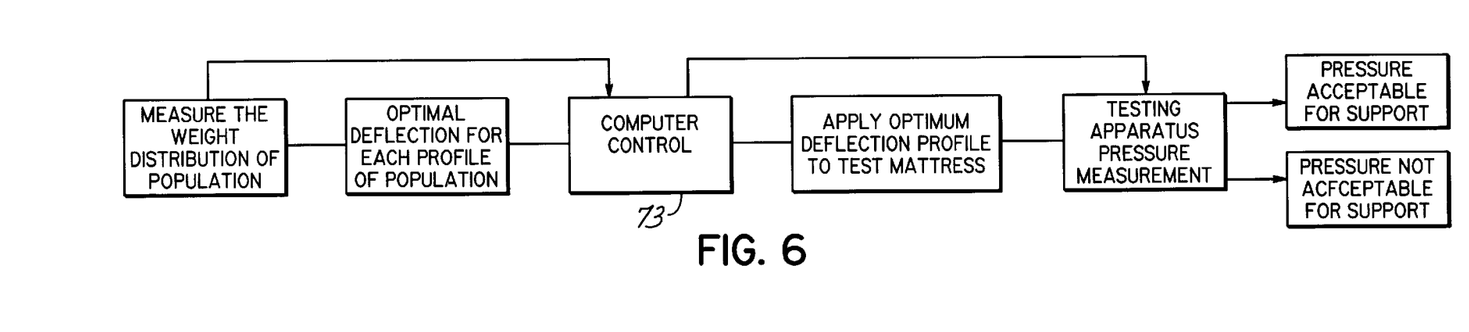

A system for assessing the specific deflection characteristics of a mattress can be utilized to determine which specific mattress design is appropriate to satisfy the mattress design parameters. Such a mattress design system is envisioned to include a machine 70, as illustrated in FIGS. 3 and 4, which has a plurality of spaced platens 71 arranged over the upper surface of selected mattress product 72. The machine 70 can be controlled to simulate each of the test persons who 46 so that the deflection characteristics of each mattress product with respect to each of the platens 71 can be measured as the platens are depressed downwardly into the mattress to determine the force versus deflection data for the particular mattress. Optimally, the multiple platens are arranged in the shape of a human body with forces in proportion to the human body and physique of each of the test persons. The deflection is controlled to be optimal from a support or optimal lumbar curve standpoint. In this way, each bedding product is rated for suitability for the support of persons having each of the body types defined by the body type parameters that the test persons produced. For each test person and bedding product, the ratings of the various products seeks to minimize support pressure, as measured by a pad 14 between the mattress 72 and the platens 71, while optimizing the lumbar curve of the test person on the product. A VISUAL BASIC computer program for controlling the machine 70 is set forth in Appendix B to this application.

The machine 70 is a piece of testing equipment designed to optimize the performance of mattresses or other bedding products for particular body types or styles defined by use of the subsystem 25. This machine 70 can measure either mattress deflection based on a predetermined pressure load or pressure based on a predetermined mattress deflection. Each of the platens 71 is driven by a pressure piston so as to mimic the shape of a portion of the human body. The pressure plates or platens 71 are strategically placed and shaped so replicate the shape of a human body when placed on a mattress or other bedding product, and are driven by piston pressure to replicate the body type characteristics of various test persons. The bedding product is rated for pressure distribution and support by placing it on the testing table and activating the pressure pistons to move the pressure plates downwardly into contact a pressure array pad 14 on the top surface of the bedding product being rated. Computer 48 provides input to the pressure pistons so that the pressure plates apply pressure to the bedding product in a desired pattern so as to mimic a specific body type lying on the bedding product. These inputs are varied to rate the reactions of different types of bedding products with different pressure patterns representative of different body types. The deflection of the individual springs reacting to a predetermined load or configuration of load are used to rate mattresses which have a desired set of deflection characteristics when a predetermined pressure pattern is placed on the bedding product. The ratings particularly take into account lumbar support or production of the optimal lumbar curve as well as a minimization of the maximum support pressure between the user and the mattress.

Additionally, the testing apparatus may determine which type of individual is best suited for a particular construction of bedding product. In this testing mode, the pressure pistons are moved a fixed distance into the bedding product corresponding to the distance a particular type of person would move the springs of the bedding product. A computer then reads the pressure on each of the pressure pistons. This information can be used to manufacture bedding products which have desired deflection characteristics at certain places on the bedding product.

From the above disclosure of the general principles of the present invention and the preceding detailed description of at least one preferred embodiment, those skilled in the art will readily comprehend the various modifications to which this invention is susceptible. Therefore, we desire to be limited only by the scope of the following claims and equivalents thereof.

We claim:

1. A method of providing for an individual person a custom bedding product that includes a box spring unit and an innerspring mattress, the method comprising the steps of:

inputing into a digital processor body type data containing weight and size information of the individual person;

with the processor, evaluating body type data and calculating body type parameters for the individual person;

correlating the body type parameters with bedding product evaluation data and thereby determining bedding product parameters specifying the design of a bedding product for providing suitable pressure distribution and lumbar support for the individual person, the bedding product parameters including at least one parameter selected from the group consisting essentially of:

at least one box spring coefficient indicative of a suitable box spring for the individual person, at least one innerspring coefficient indicative of a suitable inner spring for the individual person, and at least one pad coefficient indicative of at least a suitable mattress pad layer for the individual person, and at least one innerspring mattress fill component indicative of at least a suitable mattress fill for the individual person.

2. The method of claim 1 wherein the inputing of the body type data into the processor includes:

providing a stable support surface;

providing a pressure sensor array on the top of the support surface, the array including a plurality of pressure sensors each adapted to measure pressure exerted against an area of the pad by a person reclining on the pad; and with the individual person reclining on the pad, generating the body type data characteristic of the individual person.

3. The method of claim 2 wherein:

the stable support surface includes an airbed having at least one zone inflated to a standardized pressure.

4. The method of claim 1 wherein the inputing of the body type data into the processor includes:

providing an airbed having at least one zone inflated to an initial standardized pressure;

with the individual person reclining on the airbed, measuring pressure of air in the airbed and generating therefrom at least some of the body type data characteristic of the individual person.

5. The method of claim 4 wherein the inputing of the body type data into the processor further includes:

obtaining body type information from information provided by the individual person and entering the information into the computer.

6. The method of claim 1 wherein the inputing of the body type data into the processor includes:

obtaining body type information from information provided by the individual person and entering the information into the computer.

7. A method of providing a custom bedding product for an individual person comprising the steps of:

inputing into a digital processor body type data containing weight and size information of the individual person;

with the processor, evaluating body type data and calculating body type parameters for the individual person;

correlating the body type parameters with bedding product evaluation data and determining bedding product parameters specifying the design of a bedding product for providing suitable pressure distribution and lumbar support for the individual person;

the inputing of the body type data into the processor including:

providing a stable support surface, providing a pressure sensor array on the top of the support surface, the array including a plurality of pressure sensors each adapted to measure pressure exerted against an area of the pad by a person reclining on the pad, and with the individual person reclining on, the pad, generating the body type data characteristic of the individual person; and wherein the bedding product and body type parameters include at least one limitation selected from the group consisting essentially of:

the bedding product parameters include at least one box spring coefficient indicative of a suitable box spring for the individual person, at least one innerspring coefficient indicative of a suitable inner spring for the individual person, and at least two pad coefficients indicative of at least two suitable pad layers for the individual person.

the bedding product parameters include at least one coefficient responsive to the total weight of the individual person and the bedding product providing step includes the step of determining a box spring component of the bedding product based on the at least one coefficient, the bedding product parameters include at least one coefficient responsive to the weight distribution area of support of the individual person and the bedding product providing step includes the step of determining an innerspring component of the bedding product on the at least one coefficient, the body type parameters include at least one coefficient responsive to a selected body width of the individual person and the bedding product providing step includes the step of determining a mattress fill component of the bedding product based on the at least one coefficient, and the body type parameters include at least one coefficient responsive to the lumbar support of the individual person and the bedding product providing step includes the step of determining a box spring component of the bedding product based on the at least one coefficient.

8. The method of claim 7 wherein:

the bedding product parameters include at least one box spring coefficient indicative of a suitable box spring for the individual person, at least one innerspring coefficient indicative of a suitable inner spring for the individual person, and at least two pad coefficients indicative of at least two suitable pad layers for the individual person.

9. The method of claim 7 wherein:

the bedding product parameters include at least one coefficient responsive to the total weight of the individual person and the bedding product providing step includes the step of determining a box spring component of the bedding product based on the at least one coefficient.

10. The method of claim 7 wherein:

the bedding product parameters include at least one coefficient responsive to the weight distribution area of support of the individual person and the bedding product providing step includes the step of determining an innerspring component of the bedding product based on the at least one coefficient.

11. The method of claim 7 wherein:

the body type parameters include at least one coefficient responsive to a selected body width of the individual person and the bedding product providing step includes the step of determining a mattress fill component of the bedding product based on the at least one coefficient.

12. The method of claim 7 wherein:

the body type parameters include at least one coefficient responsive to the lumbar support of the individual person and the bedding product providing step includes the step of determining a box spring component of the bedding product based on the at least one coefficient.

13. A system for customization design of a bedding product for an individual person, the system comprising:

a support surface which provides a constant pressure of support;

a pad positioned atop the support surface;

a plurality of pressure sensors located on the pad, the pad and support surface adapted for the individual person to lie down thereon;

a processor electrically coupled to the pressure sensors to record the pressure data detected by the respective pressure sensors;

the processor being programmed with an evaluation algorithm to process the pressure data and produce a pressure profile for the individual person on the pad and in response to the pressure profile to calculate specific body shape parameters correlated to components of a bedding product providing suitable pressure distribution and lumbar support, the parameters including at least one box spring coefficient indicative of a suitable box spring for the individual person, at least one innerspring coefficient indicative of a suitable inner spring for the individual person, and at least two pad coefficients indicative of at least two suitable pad layers for the individual person.

14. The method of determining the support characteristics of a test mattress relative to a human weight and size profile, which method comprises:

(a) measuring the weight distribution profiles of numerous different height, weight and shaped persons;

(b) measuring and determining the optional deflection profile of those same persons for optimal support;

(c) inputting the information of steps (a) and (b) into a computerized control;

(d) locating a selected mattress in a test apparatus;

(e) applying a weight profile load of a selected test profile person to pistons connected to independently movable pressure plates of the test apparatus, which pressure plates are positioned and sized on the mattress so as to mimic the shape of the selected person;

(f) measuring the deflection of each pressure plate into the test mattress; and (g) comparing the measured deflection characteristics of the test mattress to the optional support deflections for the test profile person.

15. The method of determining the support characteristics of a test mattress relative to a human weight and size profile, which method comprises:

(a) measuring the weight distribution profile of numerous different height, weight and shaped persons;

(b) measuring and determining the optional deflection profile of those same persons for optimal support;

(c) inputting the information of (a) and (b) into a computerized control;

(d) locating a selected mattress in a test apparatus;

(e) applying optimum deflection characteristics profile of a selected test profile person to that mattress by applying pressure to pistons connected to independently movable pressure plates of test apparatus, which pressure plates are positioned and sized so as to mimic the shape of the selected test profile person; and (f) measuring the pressure on the pistons to obtain this optimum deflection.

* * * * *

UNITED STATES PATENT AND TRADEMARK OFFICE
CERTIFICATE OF CORRECTION

PATENT NO.     : 6,585,328 B1
DATED          : July 1, 2003
INVENTOR(S)    : Oexman et al.

It is certified that error appears in the above-identified patent and that said Letters Patent is hereby corrected as shown below:

Column 2,
Line 44, reads "These bedding, products include unique…" and should read
-- These bedding products include unique… --.

Column 3,
Line 51, reads "… and the weight born by certain…" and should read -- and the weight borne by certain… --.

Column 4,
Lines 8 and 9, reads "… which includes additional the quilted ticking and additional padding that provides the outer covering of the mattress" and should read -- which includes additional quilted ticking and additional padding that provide the outer covering of the mattress --.
Line 40, reads "… persons: (f)…" and should read -- persons; (f)… --.
Line 57, reads "… and (e measuring…" and should read -- and (f) measuring… --.

Column 5,
Line 25, reads "… design for a mattress produce that has…" and should read
-- design for a mattress product that has… --.
Line 61, reads "… can be derived form the…" and should read -- can be derived from the… --

Column 6,
Line 7, reads "… with different colors codes 61 used to…" and should read -- with different color codes 61 used to… --.
Line 22, reads "… is written the Microsoft VISUAL BASIC…" and should read
-- is written in the Microsoft VISUAL BASIC… --.
Line 46, reads "… using statistically averages body proportions ." and should read
-- using statistically average body proportions. --.
Line 64, reads "… readings of the sensors 30…is calculated…" and should read
-- readings of the sensors 30…are calculated… --.

Column 7,
Line 10, reads "… in the support are of the pad 14,…" and should read -- in the support area of the pad 14,… --.
Line 45, reads "… The suitability of … are then evaluated…" and should read -- The suitability of … is then evaluated… --.
Line 61, reads "… each of the test persons who 46 so that…" and should read -- each of the test persons 46 so that… --.

UNITED STATES PATENT AND TRADEMARK OFFICE
CERTIFICATE OF CORRECTION

PATENT NO. : 6,585,328 B1
DATED : July 1, 2003
INVENTOR(S) : Oexman et al.

It is certified that error appears in the above-identified patent and that said Letters Patent is hereby corrected as shown below:

Column 8,
Line 8, reads "… the ratings of…seeks to minimize…" and should read -- the ratings of…seek to minimize… --.
Line 23, reads "… are strategically placed and shaped so replicate the…" and should read -- are strategically placed and shaped to replicate the… --.
Line 29, reads "… move the pressure plates downwardly into contact a pressure array pad 14 on…" and should read -- move the pressure plates downwardly into contact with a pressure array pad 14 on … --.
Line 37, reads "… The deflection of… are used to rate…" and should read -- The deflection of… is used to rate… --.
Line 66, reads "… inputing…" and should read -- inputting… --.

Column 9,
Lines 20 and 35, reads "… inputing…" and should read -- inputting… --.
Lines 42 and 48, reads "… inputing…" and should read -- inputting… --.
Lines 56 and 65, reads "… inputing…" and should read -- inputting… --.

Column 10,
Line 6, reads "… with the individual person reclining on, the pad, generating…" and should read -- with the individual person reclining on the pad, generating… --.
Line 18, reads "… for the individual person. the bedding…" and should read -- for the individual person, the bedding… --.
Line 29, reads "… component of the bedding product on the at least one coefficient,…" and should read -- component of the bedding product based on the at least one coefficient,… --.

Signed and Sealed this

Twenty-fifth Day of November, 2003

JAMES E. ROGAN
*Director of the United States Patent and Trademark Office*